US006784939B1

(12) United States Patent
Lee et al.

(10) Patent No.: US 6,784,939 B1
(45) Date of Patent: Aug. 31, 2004

(54) APPARATUS AND METHOD FOR AUTOMATICALLY CONTROLLING EXPOSURE TIME USING A MEAN VALUE OF GREEN PIXELS

(75) Inventors: Suk-Joong Lee, Ichon-shi (KR); Gyu-Tae Hwang, Ichon-shi (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/428,534

(22) Filed: Oct. 28, 1999

(30) Foreign Application Priority Data

Oct. 28, 1998 (KR) ......................................... 1998-45280

(51) Int. Cl.[7] .......................... H04N 5/238; H04N 3/14; H04N 5/335
(52) U.S. Cl. ....................................... 348/364; 348/308
(58) Field of Search ......................................... 348/362

(56) References Cited

U.S. PATENT DOCUMENTS

| | | | | |
|---|---|---|---|---|
| 5,065,247 A | * | 11/1991 | Haruki | 348/364 |
| 5,671,013 A | * | 9/1997 | Nakao | 348/234 |
| 5,874,994 A | * | 2/1999 | Xie et al. | 348/349 |
| 5,880,782 A | * | 3/1999 | Koyanagi et al. | 348/364 |
| 5,953,062 A | * | 9/1999 | Sugimori et al. | 348/364 |
| 6,239,840 B1 | * | 5/2001 | Shibuya et al. | 348/362 |

FOREIGN PATENT DOCUMENTS

| | | | | |
|---|---|---|---|---|
| JP | 11-004453 | * | 1/1999 | H04N/9/04 |

* cited by examiner

Primary Examiner—Andrew Christensen
Assistant Examiner—Tia M. Harris
(74) Attorney, Agent, or Firm—Jacobson Holman PLLC

(57) ABSTRACT

A method for automatically controlling an exposure time in image sensor having a pixel array includes the steps of producing total pixel value of the green pixels from the pixel array, producing a mean value of the green pixels dividing the total pixel value of the green pixels by the number of the green pixels, producing a deviation value, wherein the deviation value is an absolute value of a difference between the mean value and a predetermined reference value, comparing the deviation value with a predetermined boundary value, in case where the deviation value is smaller than the predetermined boundary value, capturing a next image according to a current exposure time, and in case where the deviation value is larger than the predetermined boundary value, calculating an exposure control rate and determining whether an automatic exposure control mode is enabled, and in case where the automatic exposure control mode is disabled, capturing the next image according to the current exposure time, and in case where the automatic exposure control mode is enabled, capturing the next image according a next exposure time, wherein the next exposure time is calculated multiplying the current exposure time by the exposure control rate.

12 Claims, 5 Drawing Sheets

APPARATUS AND METHOD FOR AUTOMATICALLY CONTROLLING EXPOSURE TIME USING A MEAN VALUE OF GREEN PIXELS

FIELD OF THE INVENTION

The present invention relates to an image processing devices; and, more particularly, to an apparatus and method for automatically controlling an exposure time using a mean value of green pixels in an image sensor, reducing a burden of hardware and software and improving a performance of the image sensor.

DESCRIPTION OF THE PRIOR ART

A conventional image sensor has controlled an illuminance of image using software. Software calculates a current illuminance using a captured image value. Then, if the calculated illuminance is judged to be very bright or very dark, an external controller adjusts the illuminance of the image. Thereafter, illuminance of the adjusted image is again read to judge the illuminance of the image.

In such a conventional method for controlling illuminance through software, however, the actual judgement of the illuminance is completed after processing at least two images from the image sensor. Therefore, a problem may occur and the software is burdened with an increased amount of calculation. In addition, the calculated results should be again programmed through a programming interface and the programmed results is applied to the image capturing, so that a considerable delay time is required. Furthermore, in case the image sensor is used in such as CCTV (Closed Circuit Television), where it is difficult for software to control the illuminance, it may not cope with the change of situation initially set up.

SUMMARY OF THE INVENTION

It is, therefore, an object of the present invention to provide an apparatus and method for automatically controlling exposure time using an green pixel value in an image sensor, reducing a burden of hardware and software and improving a performance of the image sensor.

In accordance with an embodiment of present invention, there is provided a method for automatically controlling an exposure time using a mean value of green pixels in image sensor, wherein the image sensor includes a pixel array, the method comprising the steps of a) producing total pixel value of the green pixels from the pixel array; b) producing a mean value of the green pixels dividing the total pixel value of the green pixels by the number of the green pixels; c) producing a deviation value, wherein the deviation value is an absolute value of a difference between the mean value and a predetermined reference value; d) comparing the deviation value with a predetermined boundary value; e) in case where the deviation value is smaller than the predetermined boundary value, capturing a next image according to a current exposure time, and in case where the deviation value is larger than the predetermined boundary value, calculating an exposure control rate and determining whether an automatic exposure control mode is enabled; and f) in case where the automatic exposure control mode is disabled, capturing the next image according to the current exposure time, and in case where the automatic exposure control mode is enabled, capturing the next image according a next exposure time, wherein the next exposure time is calculated multiplying the current exposure time by the exposure control rate.

In accordance with another embodiment of the present invention, there is provided an image sensor for automatically control an exposure time using a mean value of green pixels, comprising; a) an operation means for receiving a size of window in window mode, green pixel values from a plurality of the green pixels, a current exposure time and a predetermined reference value to perform an addition and shift operation in response to a control signal; b) a storage means for storing an operation results from the operation means in response to a clock signal; c) an operation control means for receiving the operation results from the storage means, an area of the window for calculating the number of the green pixels in window mode and a line number to output the control signal, wherein the operation results include a updated exposure time, an exposure control rate, a mean value of the green pixels and the number of the green pixels; d) an update determination means for determining whether to update an exposure time and outputting an updating signal in response to the predetermined reference value, an predetermined boundary value and the mean value of the green pixels from the storage means; and e) an exposure time generating means for receiving the new exposure time and outputting the updated exposure time as a next exposure time of next image in response to the updating signal from the update determination means and an automatic exposure control mode.

BRIEF DESCRIPTION OF THE DRAWINGS

The above and other objects and features of the present intention will become apparent from the following description of the preferred embodiments given with reference to the accompanying drawings, in which.

DETAILED DESCRIPTION OF THE PREFERRED EMBODIMENTS

Figure 1:
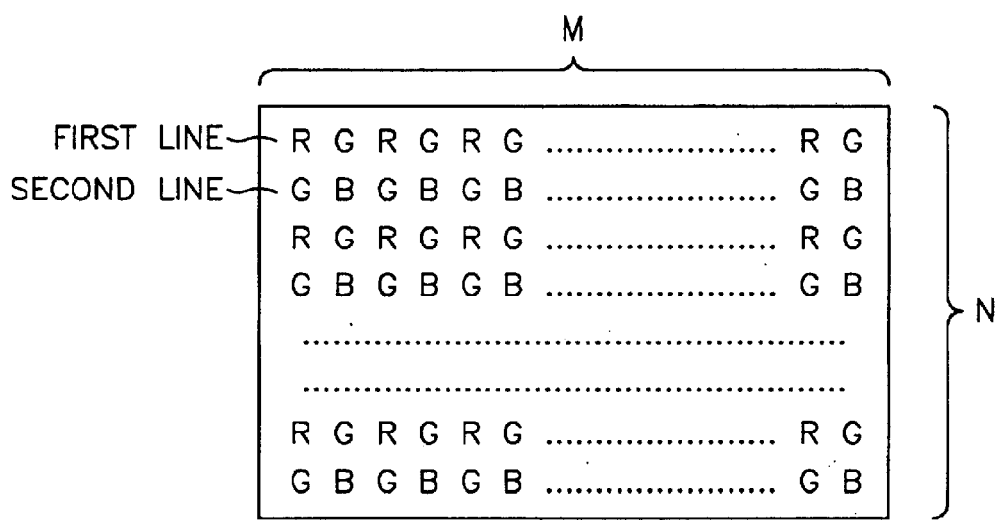
FIG. 1 is a diagram showing an N×M unit pixel array having pixels arranged as a form of a typical Bayer pattern.

FIG. 1 is a diagram showing a N×M pixel array arranged as a form of Bayer pattern. Referring to FIG. 1, a pixel array includes repetitive arrangements of a RGRG type and a GBGB type every odd and even line. Here, "R" represents a red pixel for transmitting only red color, "G" a green pixel for transmitting only green color and "B" a blue pixel for transmitting blue color.

In the Bayer pattern, the green pixels are two times as many as the red or blue pixels is that the green color greatly affects the illuminance as given in Eq. 1.

$$Y = 0.30R + 0.59G + 0.11B \quad \text{(Eq. 1)},$$

where Y is a illuminance, R is a red pixel value, G is a green pixel value and B is a blue pixel value.

According to the Eq. 1, however, all of the red, green and blue pixel values are needed to calculate the illuminance, resulting in an increase of an amount of calculation.

FIG. 12 is a typical structure of a pixel contained in the pixel array shown in FIG. 1.

Figure 2:
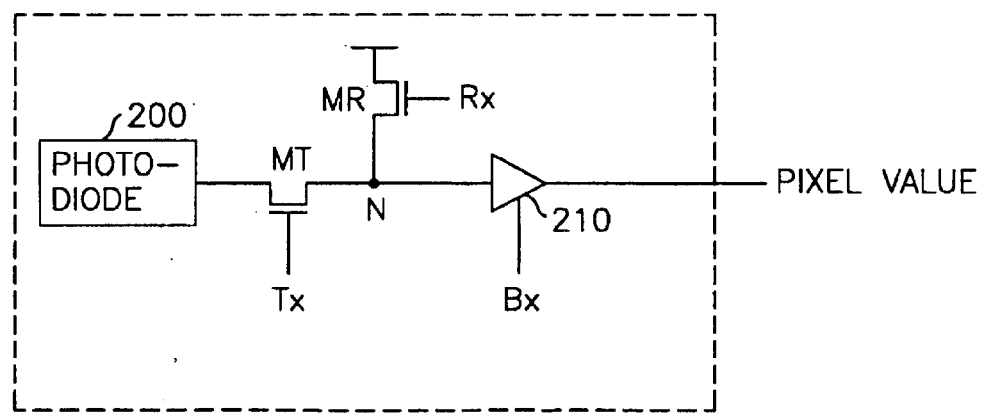
FIG. 2 is a schematic diagram illustrating a pixel contained in pixel array shown in FIG. 1.

Referring to FIG. 2, the pixel includes a photodiode 200 for receiving light from an object and generating photoelectric charges, a transfer transistor MT, in response to a transfer control signal Tx, for transferring the photoelectric charges to a sensing node N, a reset transistor MR, in response to a reset control signal Rx, for transferring a reset voltage level to the photodiode 200 and an output buffer 210, and the output buffer 210, in response to a buffer control signal, for outputting the reset voltage level and the output signal of the photodiode 200.

Referring to FIG. 2, an operation of the pixel will be described below.

First, the reset transistor MR and the transfer transistor MT are simultaneously turned on to thereby make a fully depleted region in the photodiode 200. Next, the transfer transistor MT is turned off while the reset transistor MR is kept on a turned-on state, so that the photodiode 200 generates the photoelectric charges.

Then, after turning on the transfer transistor MT, the output buffer 210 outputs the photoelectric charges as a pixel value to an external circuit in response to the buffer control signal Bx. Like typical memory devices, each pixel contained in the pixel array shares the buffer control signal line by line.

Meanwhile, an amount of the photoelectric charges to be accumulated in the photodiode 200 is proportional to a time period during which the transfer transistor MT is kept in a turned-off state in response to the transfer control signal Tx. Therefore, in the case where an image is captured in a dark place, the transfer transistor MT should be kept in a turned-off state for a long time, but in the case where an image is captured in a bright place, the transfer transistor MT should be kept in a turned-off state for a short time. At this time, the time period when the transfer transistor MT is kept in the turned-off state is called an exposure time or an integration time. Therefore, the illumination can be controlled by controlling the exposure time.

Figure 3:
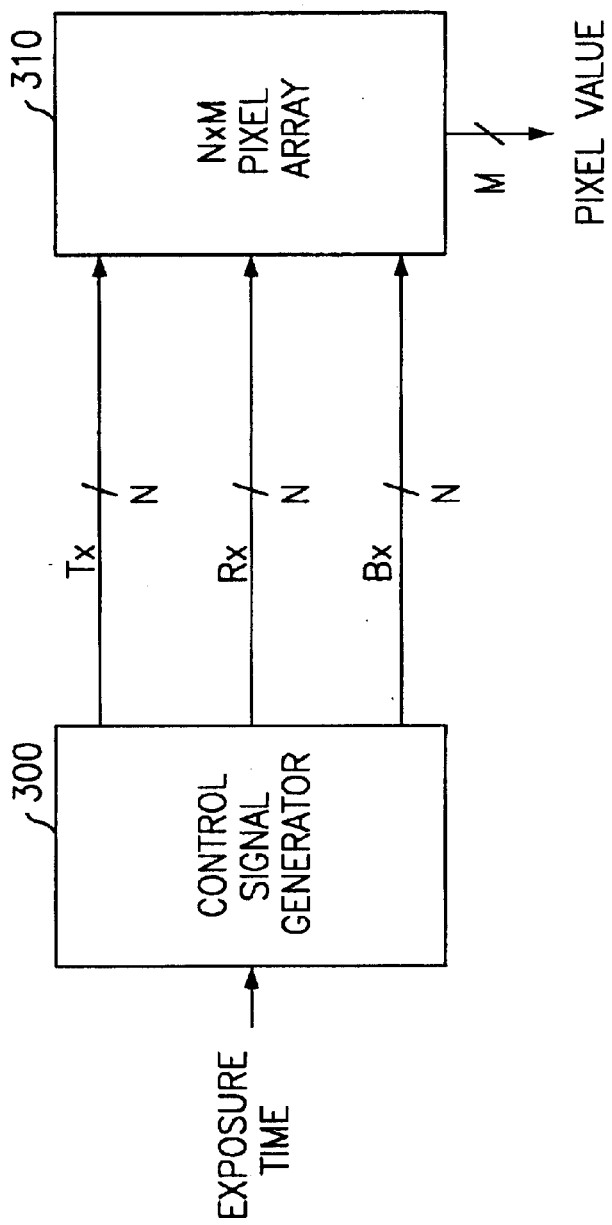
FIG. 3 is a block diagram illustrating an interconnection relationship between a pixel array and a control signal generator.

FIG. 3 is a block diagram showing an interconnection relationship between a M×N unit pixel array and a control signal generator. The control signal generator 300 generates the N number of the transfer control signal Tx, a reset control signal Rx and the buffer control signal Bx under a control of an exposure time. The N×M pixel array 310 outputs the M number of the pixel values in response to the N numbers of the transfer control signal Tx, the reset control signal Rx and the buffer control signal Bx.

Figure 4:
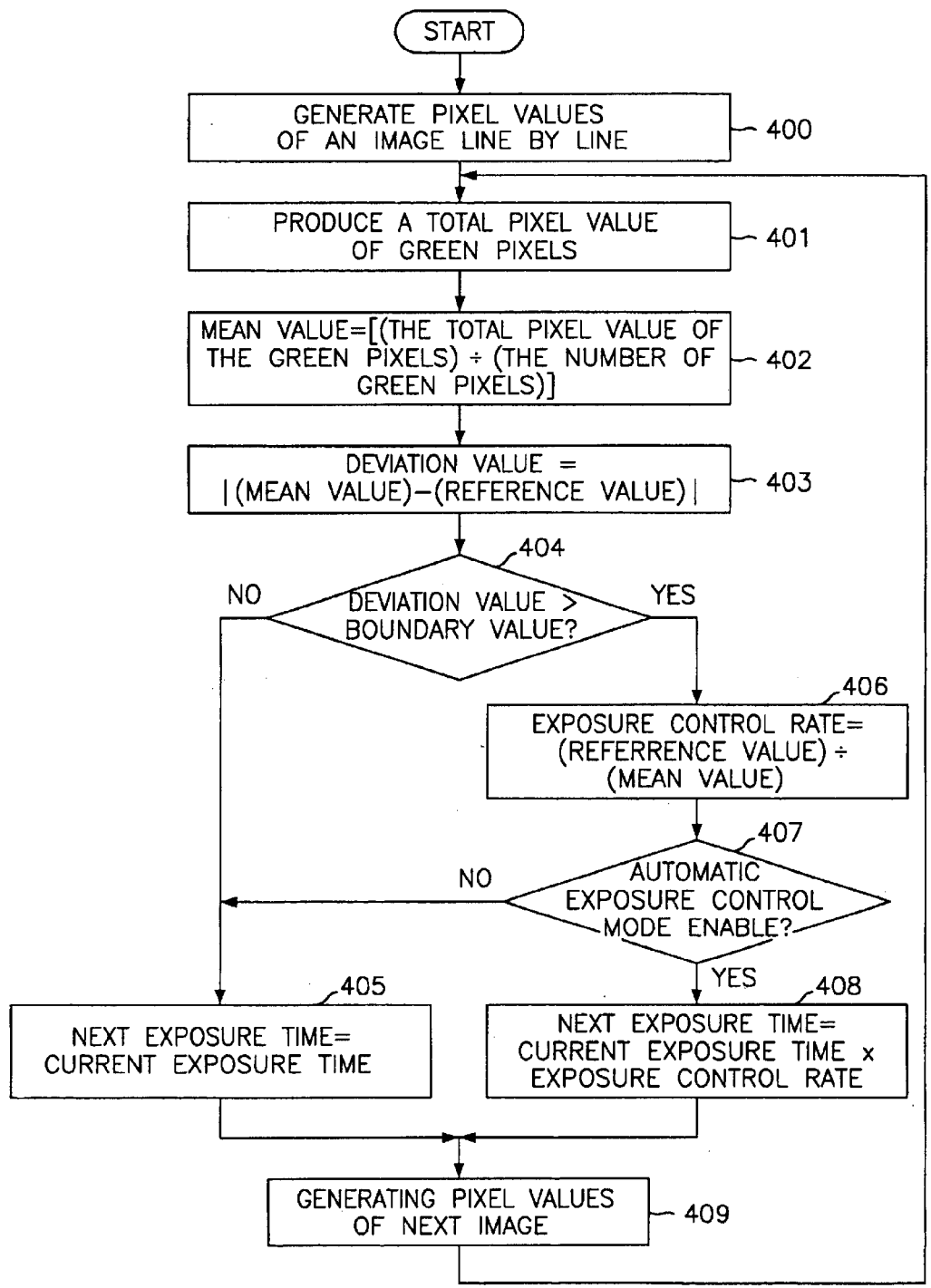
FIG. 4 is a flow chart illustrating a method for automatically controlling an exposure time in accordance with the present invention.

FIG. 4 is a flow chart illustrating a method for controlling the exposure time.

Referring to FIG. 4, an image sensor captures an image to generate pixel values corresponding to the image line by line (400), and a total pixel value of green pixels is produced by adding the pixel values (401). Then, a mean value of the green pixels is produced by dividing the total pixel value of the green pixels by the number of green pixels (402). At this time, the mean value represents a degree of a illuminance of current image.

Then, a deviation value is produced; wherein the deviation value is defined as an absolute value of a difference between the mean value and a predetermined reference value (403). At this time, the predetermined reference value can be programmed according to a various illuminance desired by the user, so that the entire illuminance is adjusted brightly or darkly.

Then, the deviation value is compared with a predetermined boundary value (404). At this time, the predetermined boundary value can be programmed, changeable depending on the changing situation. In case where the deviation value is smaller than the predetermined boundary value, it means that it is unnecessary to control the current illuminance.

As a result of the comparison, in case where the boundary value are larger than the deviation value, a next exposure time is identical to the current exposure time (405), and a next image is captured according to the current exposure time (409), and in case where the boundary value is smaller than the deviation value, an exposure control rate is calculated by dividing the reference value by the mean value of green pixels (406). Thereafter, whether an automatic exposure control mode is enabled or not is determined (407).

In case where the automatic exposure control mode is disabled, a next exposure time is identical to the current exposure time (405), and a next image is captured according to the current exposure time (409). In case where the automatic exposure control mode is enabled, a next exposure time is calculated multiplying the current exposure time by the exposure control rate (408), and a next image is captured according to the calculated next exposure time (409). At this time, the reason for existence of the automatic exposure control mode is that the user may not want to automatically control the illuminance.

For calculating the exposure time, an adder, a multiplication unit and a division unit required. However, an implementation of the multiplication unit and the division unit occupies a very large area. Therefore, the present invention uses only an adder and a shifter, thereby minimizing logic. That is, since addition, division and multiplication operations are not performed at the same time, the multiplication operation can be performed by shift and addition operations according to bit values of multiplier, and the division operation is performed by shift and subtraction operations, according to bit values of divisor in a resource-sharing dimension.

Figure 5:
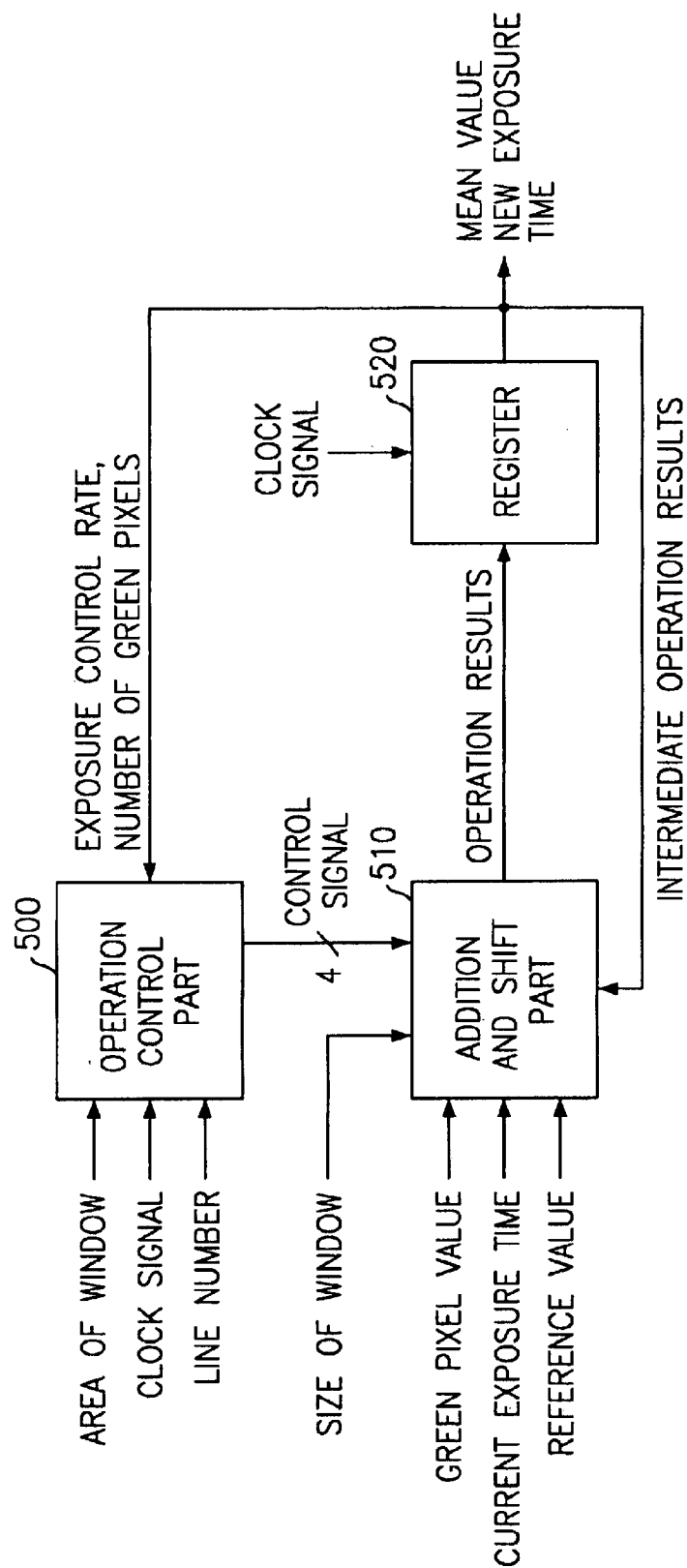
FIG. 5 is a block diagram illustrating an apparatus for automatically calculating mean value of green pixels and updated exposure time in accordance with the present invention.

FIG. 5 is a block diagram illustrating an apparatus for calculating a mean value of green pixels and updated exposure time according to the present invention.

Referring to FIG. 5, an addition and shift part 510 receives a size of window in window mode, green pixel values, a current exposure time and a predetermined reference value and performs an addition operation and a shift operation in response to a control signal. A register 520 temporarily stores the operation results including an exposure control rate, a mean value of the green pixels, the number of the green pixels and a new integration time from the addition and shift unit 510 and outputs the operation results in response to a clock signal. An operation control part 500 receives the exposure control rate, the mean value of the green pixels and the number of the green pixels from the register 520, and a clock signal, an area of the window and line number from an external circuit and outputs a control signal to the addition and shift unit 510, wherein the area of the window is used to calculate the number of the pixels in the window mode.

For an effective source sharing and a resource-sharing dimension, when a first line and a last line are processed, multiplication and division operations are performed instead of calculating the pixel values of the green pixels.

During processing of the first line, the number of the green pixels is given by Eq. 2:

NUMBER OF THE GREEN PIXELS=$(N-2) \times (M/2)$ (Eq. 2)

During processing of second line to (N−1)th line, the green pixel values from each line are added to produce a total pixel value of the green pixels. During processing of (N)th line, a mean value of green pixels is calculated dividing the total pixel value of the green pixels by the number of the green pixels, and the exposure control rate is calculated dividing the predetermined reference value by the mean value of the green pixels. Further, new exposure time is calculated multiplying the exposure control rate by the current exposure time.

The 4-bit control signal outputted from the operation control unit 500 to the addition and shift unit 510 instructs operations to the addition and shift unit 510. The operations according to each bit of the control signal is as follows:

a) in case where the control signal [3] is equal to "1", an addition operation is performed;

b) in case where the control signal [2] is equal to "1", a subtraction operation is performed;

c) in case where the control signal [1] is equal to "1", a shift-left operation is performed; and d) in case where the control signal [0] is equal to "1", a shift-right operation is performed.

For the addition of the green pixel values from the second line to the (N−1)th line, only the control signal [3] is set to "1". When calculating the mean value of the green pixels and the exposure control rate in processing of (N)th line, the control signal [2] and the control signal [0] are controlled to perform the division operation. At this time, the exposure control rate is calculated dividing the predetermined reference value by the mean value of the green pixels. Also, when calculating the number of the green pixels and the next exposure time using the exposure control time in processing of the first line, the control signal [3] and the control signal [0] is controlled to perform the multiplication operation.

Since the green pixels are arranged every two pixels, the operation control unit 500 needs the clock signal. Furthermore, since information of the green pixels is different in odd lines and even lines in the Bayer pattern, the line number is required for the information of the current line. The mean value of the green pixels and the number of the green pixels are for the division operation and the exposure control rate is for the multiplication operation. In the multiplication operation, the exposure control rate and the size of window become a multiplier and the addition operation is determined according to each value of bits. Similarly, the mean value of the green pixels and the number or the green pixels become a divisor and the subtraction operation is determined according to each value of bits.

In processing of the first line, the number of the green pixels is calculated and the size of window becomes a multiplicand. In processing of the second line to the (N−1)th line, the total pixel value of the green pixels is calculated continuously adding partial sums of the green pixels. The total pixel value becomes a dividend when processing the (N)th line and a quotient becomes the mean value. The exposure control rate is calculated dividing the predetermined reference value by the mean value, wherein the reference value is also the dividend. The updated exposure time is produced multiplying the exposure control rate by the current exposure time.

Figure 6:
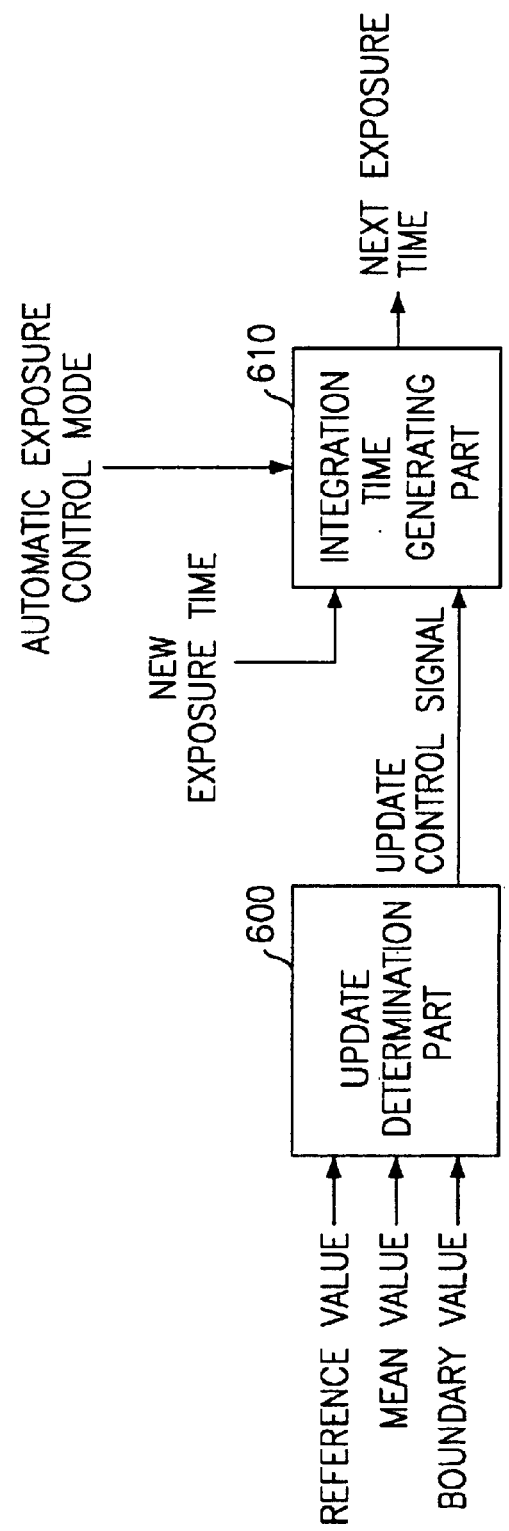
FIG. 6 is a block diagram illustrating an exposure time generator in accordance with the present invention.

FIG. 6 is a block diagram illustrating an apparatus for generating the exposure time in accordance with the present invention.

Referring to FIG. 6, an updating determination unit 600 determines whether to update the exposure time or not and outputs an update control signal in response to the predetermined reference value, the predetermined boundary value and the mean value from the register (520, in FIG. 5). An exposure time generating unit 610 receives the updated exposure time from the register (520, in FIG. 5) and outputs an exposure time of in response to the update control signal and the automatic exposure control mode.

Referring to FIG. 4 and FIG. 6, comparing the deviation value with the predetermined boundary value, in case where the deviation value is larger than the predetermined boundary value, the exposure time is updated. Only when the automatic exposure control mode and the update control signal are enabled, the next exposure time is generated and a next image is captured through it.

The present invention can be applied to image sensors having pixel array arranged as a form of other patterns as well as the Bayer pattern. Furthermore, the burdens of software and hardware can be effectively reduced and performance of the image sensor can be greatly improved.

While the present invention has been described with respect to certain preferred embodiments only, other modifications and variation may be made without departing from the spirit and scope of the present invention as set forth in the following claims.

What is claimed is:

1. A method for automatically controlling an exposure time in a CMOS image sensor, wherein the image sensor includes a pixel array, the method comprising the steps of:

a) producing a total pixel value only for a number of the green pixels from the pixel array;

b) producing a mean value of the green pixels by dividing the total pixel value of the green pixels by the number of the green pixels;

c) producing a deviation value, wherein the deviation value is an absolute value of a difference between the mean value of the green pixels and a predetermined reference value;

d) comparing the deviation value with a predetermined boundary value;

e) in case where the deviation value is smaller than the predetermined boundary value, capturing a next image according to a current exposure time, and in case where the deviation value is larger than the predetermined boundary value, calculating an exposure control rate and determining whether an automatic exposure control mode is enabled, said exposure control rate being calculated instead of performing the steps of a) and b) in a first line and a last line of the pixel array; and f) in case where the automatic exposure control mode is disabled, capturing the next image according to the current exposure time, and in case where the automatic exposure control mode is enabled, capturing the next image according to a next exposure time, wherein the next exposure time is calculated by multiplying the current exposure time by the exposure control rate.

2. The method as recited in claim 1, wherein the step a) is performed line by line.

3. The method as recited in claim 1, wherein the predetermined reference value is programmed by a user.

4. The method as recited in claim 1, wherein the boundary value is programmed by a user.

5. The method as recited in claim 1, wherein the exposure control rate is calculated by dividing the reference value by the mean value of green pixels.

6. A CMOS image sensor for automatically controlling an exposure time, comprising:

a) an operation means for receiving a size of window in window mode, green pixel values from a plurality of green pixels, a current exposure time and a predetermined reference value to perform an addition and shift operation in response to a control signal;

b) a storage means for storing operation results from the operation means in response to a clock signal;

c) an operation control means for receiving the operation results from the storage means, an area of the window for calculating a number of the green pixels in window mode and a line number to output the control signal, wherein the operation results include an updated exposure time, an exposure control rate, a mean value of the green pixels only and the number of the green pixels, said exposure control rate being calculated instead of performing the steps of a) and b) in a first line and a last line of the pixel array;

d) an update determination means for determining whether to update an exposure time and outputting an updating signal in response to the predetermined reference value, a predetermined boundary value and the mean value of the green pixels only from the storage means; and e) an exposure time generating means for receiving the updated exposure time and outputting the updated exposure time as a next exposure time of a next image in response to the updating signal from the update determination means and an automatic exposure control mode.

7. The image sensor as recited in claim 6, wherein the predetermined reference value is programmed by a user.

8. The image sensor as recited in claim 6, wherein the boundary value is programmed by a user.

9. The method as recited in claim 1, wherein the number of the green pixels, which are used for calculating the exposure control rate, is $(N-2) \times (M/2)$ if the pixel array has N×M pixels, with N being a number of lines and M being a number of pixels in each line.

10. The method as recited in claim 9, wherein N and M are positive integers having a value of at least 2.

11. The image sensor as recited in claim 6, wherein the number of the green pixels, which are used for calculating the exposure control rate, is $(N-2) \times (M/2)$ if the pixel array has N×M pixels, with N being a number of lines and M being a number of pixels in each line.

12. The image sensor as recited in claim 11, wherein N and M are positive integers having a value of at least 2.

* * * * *